(12) United States Patent
　　　Lin et al.

(10) Patent No.: US 9,778,773 B2
(45) Date of Patent: Oct. 3, 2017

(54) METHOD AND DEVICE FOR DECREASING LEAKAGE CURRENT OF IN-CELL TOUCH LIQUID CRYSTAL PANEL

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Jian-hong Lin, Guangdong (CN); Yucheng Tsai, Guangdong (CN); Yao-li Huang, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 141 days.

(21) Appl. No.: 14/902,029

(22) PCT Filed: Oct. 30, 2015

(86) PCT No.: PCT/CN2015/093351
§ 371 (c)(1),
(2) Date: Dec. 30, 2015

(87) PCT Pub. No.: WO2017/049714
PCT Pub. Date: Mar. 30, 2017

(65) Prior Publication Data
　　US 2017/0249036 A1　Aug. 31, 2017

(30) Foreign Application Priority Data
　Sep. 23, 2015　(CN) .......................... 2015 1 0613015

(51) Int. Cl.
　　*G06F 3/041*　　(2006.01)
　　*G06F 3/044*　　(2006.01)
　　(Continued)

(52) U.S. Cl.
　　CPC .......... *G06F 3/0412* (2013.01); *G02F 1/1368* (2013.01); *G02F 1/13338* (2013.01);
　　(Continued)

(58) Field of Classification Search
　　CPC ...... G06F 3/0412; G06F 3/0416; G06F 3/044; G02F 1/13338; G02F 1/136286; G02F 1/1368; G02F 2201/121
　　See application file for complete search history.

(56) References Cited

U.S. PATENT DOCUMENTS

2001/0030719 A1* 10/2001 Yamaguchi ........... G02F 1/1368
　　　　　　　　　　　　　　　　　　　　　　349/43
2003/0197815 A1* 10/2003 Choi ................. G02F 1/136286
　　　　　　　　　　　　　　　　　　　　　　349/43
2014/0267967 A1*  9/2014 Ro ..................... G02F 1/136213
　　　　　　　　　　　　　　　　　　　　　　349/43

FOREIGN PATENT DOCUMENTS

CN　　　　104252274 A　　12/2014

* cited by examiner

*Primary Examiner* — Sejoon Ahn
(74) *Attorney, Agent, or Firm* — Andrew C. Cheng

(57) ABSTRACT

The disclosure provides a method and a device for decreasing a leakage current of an in-cell touch liquid crystal panel. The method includes: outputting a signal after adjusting a voltage by the data line during a time period of scanning a touch signal according to a voltage on the data line connected to the pixel and a signal inputted to a common electrode of the pixel for scanning the touch signal, so as to decrease a drain source voltage of a thin film transistor in the (Continued)

pixel. According the method and the device, it is capable of decreasing the leakage current of the in-cell touch liquid crystal panel effectively.

2 Claims, 4 Drawing Sheets

(51) Int. Cl.
    *G02F 1/1333*    (2006.01)
    *G02F 1/1368*    (2006.01)
    *G02F 1/1362*    (2006.01)

(52) U.S. Cl.
    CPC ........ *G02F 1/136286* (2013.01); *G06F 3/044* (2013.01); *G06F 3/0416* (2013.01); *G02F 2201/121* (2013.01)

METHOD AND DEVICE FOR DECREASING LEAKAGE CURRENT OF IN-CELL TOUCH LIQUID CRYSTAL PANEL

BACKGROUND OF THE INVENTION

Field of the Invention

The disclosure is related to the in-cell touch liquid crystal panel technology field, and more particular to a method and a device for decreasing a leakage current of an in-cell touch liquid crystal panel.

Discussion of the Related Art

The liquid crystal display equipped with the touch panel touch is a portable flat panel display widely usedcurrently, which has been gradually become a display with high-resolution color display screen widely used by a variety of electronic devices (e.g., a mobile communication terminal, a personal digital assistant (PDA), a digital camera, a computer, a notebook computer, etc.). In recent years, the original external touch panel member and the liquid crystal panel are manufactured integrally (in-cell touch), thereby achieving thinness and lightweight of the panel, and the manufacturing cost is saved due to the touch sensor embedded in the pixel.

Currently, the general in-cell touch liquid crystal displays is usually composed of a upper substrate, a lower substrate and an intermediate liquid crystal layer, and the substrate is composed of a glass, a electrodes and etc. If both of the upper substrate and the lower substrate have electrodes, which may form a display with the vertical electric field mode, such as TN (twist nematic) mode, VA (vertical alignment) mode, and MVA (Multidomain Vertical Alignment) mode developed for solving a narrow viewing angle. Another type display is different from the above display, in which the electrode is only located on one side of the substrate to form a display with the transverse electric field mode, such as IPS (In-plane switching) mode, FFS (Fringe Field Switching) and etc. Since the structure of the in-cell touch liquid crystal panel, the electrodes thereof often commonly use one electrode of the vertical electric field or the transverse electric field, i.e. the common electrode, and its operating principle is: when scanning a touch signal, a signal originally inputted to the common electrode for the display is transformed into a signal for scanning the touch signal, after scanning the touch signal is end, the signal is then transferred into a signal for the display.

FIG. 1 is a schematic view of a pixel array of an in-cell touch liquid crystal panel. As shown in FIG. 1, D1-D5 indicate data lines, G1-G5 indicate scan lines. FIG. 2 is a schematic view of a pixel circuit. As shown in FIG. 2, the pixel circuit includes: a thin film transistor, a liquid crystal capacitor (Clc), a storage capacitor (Cst), a parasitic capacitor (Cgs) between a gate and a source of the thin film transistor, a pixel electrode (pixel ITO), a common electrode on a side of a color filter layer and a common electrode on a side of an array layer. Since in the panel with the transverse electric field mode, there is no common electrode on the side of the color filter layer, and there is only the common electrode on the side of the array layer. Therefore, the liquid crystal capacitor and the storage capacitor are connected to the common electrode of the side of the array layer.

In the existing in-cell touch liquid crystal panel, a larger leakage current still exists and results in increase of the power consumption and low frame quality.

SUMMARY

An exemplary embodiment of the disclosure provides a method and a device for decreasing a leakage current of an in-cell touch liquid crystal panel, so as to overcome the problem in which the leakage current of the existing in-cell touch liquid crystal panel is larger.

According to an exemplary embodiment of the disclosure, a method for decreasing a leakage current of an in-cell touch liquid crystal panel is provided, wherein the panel includes a pixel array and a scan line and a data line connected to each pixel in the pixel array. The method includes: outputting a signal after adjusting a voltage by the data line during a time period of scanning a touch signal according to a voltage on the data line connected to the pixel and a signal inputted to a common electrode of the pixel for scanning the touch signal, so as to decrease a drain source voltage of a thin film transistor in the pixel.

In one embodiment, the thin film transistor is a P type transistor, wherein, when the voltage on the data line connected to the pixel is in a positive half period and the signal inputted to the common electrode of the pixel for scanning the touch signal is a pulse signal transformed from a low level to a high level, outputting a signal after increasing a voltage by the data line during the time period of scanning the touch signal.

In one embodiment, a voltage region of the signal of after increasing the voltage is: $[V_{data(min)}+(Vgh-Vgl)*Cgs/(Clc_{min}+Cst)]$ to $[V_{data(max)}+(Vgh-Vgl)*Cgs/(Clc_{max}+Cst)]$, wherein, $V_{data(min)}$ indicates a minimum voltage on the data line, $V_{data(max)}$ indicates a maximum voltage on the data line, Vgh indicates a maximum voltage on the scan line, Vgl indicates a minimum voltage on the scan line, Cgs indicates a capacitance value of a parasitic capacitor between a gate and a source of the thin film transistor, Cst indicates a capacitance value of a storage capacitor, $Clc_{min}$ indicates a minimum capacitance value of a liquid crystal capacitor, and $Clc_{max}$ indicates a maximum capacitance value of the liquid crystal capacitor.

In one embodiment, thin film transistor is a N type transistor, wherein, when the voltage on the data line connected to the pixel is in a negative half period and the signal inputted to the common electrode of the pixel for scanning the touch signal is a pulse signal transformed from a high level to a low level, outputting a signal after decreasing a voltage by the data line during the time period of scanning the touch signal.

In one embodiment, a voltage region of the signal after decreasing the voltage is: $[-V_{data(min)}-(Vgh-Vgl)*Cgs/(Clc_{min}+Cst)]$ to $[-V_{data(max)}-(Vgh-Vgl)*Cgs/(Clc_{max}+Cst)]$, wherein, $V_{data(min)}$ indicates a minimum voltage on the data line, $V_{data(max)}$ indicates a maximum voltage on the data line, Vgh indicates a maximum voltage on the scan line, Vgl indicates a minimum voltage on the scan line, Cgs indicates a capacitance value of a parasitic capacitor between a gate and a source of the thin film transistor, Cst indicates a capacitance value of a storage capacitor, $Clc_{min}$ indicates a minimum capacitance value of a liquid crystal capacitor, and $Clc_{max}$ indicates a maximum capacitance value of the liquid crystal capacitor.

According to another exemplary embodiment of the disclosure, a device for decreasing a leakage current of an in-cell touch liquid crystal panel is provided, wherein the panel includes a pixel array and a scan line and a data line connected to each pixel in the pixel array. The device includes: a voltage control unit, for outputting a signal after adjusting a voltage through the data line during a time period of scanning a touch signal according to a voltage on the data line connected to the pixel and a signal inputted to a common electrode of the pixel for scanning the touch signal, so as to decrease a drain source voltage of a thin film transistor in the pixel.

In one embodiment, the thin film transistor is a P type transistor, wherein, when the voltage on the data line connected to the pixel is in a positive half period and the signal inputted to the common electrode of the pixel for scanning the touch signal is a pulse signal transformed from a low level to a high level, the voltage control unit outputs a signal after increasing a voltage by the data line during the time period of scanning the touch signal.

In one embodiment, a voltage region of the signal after increasing the voltage is: $[V_{data(min)}+(Vgh-Vgl)*Cgs/(Clc_{min}+Cst)]$ to $[V_{data(max)}+(Vgh-Vgl)*Cgs/(Clc_{max}+Cst)]$, wherein, $V_{data(min)}$ indicates a minimum voltage on the data line, $V_{data(max)}$ indicates a maximum voltage on the data line, Vgh indicates a maximum voltage on the scan line, Vgl indicates a minimum voltage on the scan line, Cgs indicates a capacitance value of a parasitic capacitor between a gate and a source of the thin film transistor, Cst indicates a capacitance value of a storage capacitor, $Clc_{min}$ indicates a minimum capacitance value of a liquid crystal capacitor, and $Clc_{max}$ indicates a maximum capacitance value of the liquid crystal capacitor.

In one embodiment, the thin film transistor is a N type transistor, wherein, when the voltage on the data line connected to the pixel is in a negative half period and the signal inputted to the common electrode of the pixel for scanning the touch signal is a pulse signal transformed from a high level to a low level, the voltage control unit outputs a signal after decreasing a voltage through the data line during the time period of scanning the touch signal.

In one embodiment, a voltage region of the signal of after decreasing the voltage is: $[-V_{data(min)}-(Vgh-Vgl)*Cgs/(Clc_{min}+Cst)]$ to $[-V_{data(max)}-(Vgh-Vgl)*Cgs/(Clc_{max}+Cst)]$, wherein, $V_{data(min)}$ indicates a minimum voltage on the data line, $V_{data(max)}$ indicates a maximum voltage on the data line, Vgh indicates a maximum voltage on the scan line, Vgl indicates a minimum voltage on the scan line, Cgs indicates a capacitance value of a parasitic capacitor between a gate and a source of the thin film transistor, Cst indicates a capacitance value of a storage capacitor, $Clc_{min}$ indicates a minimum capacitance value of a liquid crystal capacitor, and $Clc_{max}$ indicates a maximum capacitance value of the liquid crystal capacitor.

According to the exemplary embodiment of the disclosure, in the method and the device for decreasing the leakage current of the in-cell touch liquid crystal panel, it is capable of decreasing the drain source voltage of the thin film transistor in the pixel, thereby effectively decreasing the leakage current and increasing the frame quality.

In the following description, it will explain the additional aspects and/or advantages of the overall concept of the disclosure in part, and a part will be obvious through the description, or it may be known through the implementation of the overall concept of the disclosure.

DETAILED DESCRIPTION OF THE PREFERRED EMBODIMENTS

Figure 1:
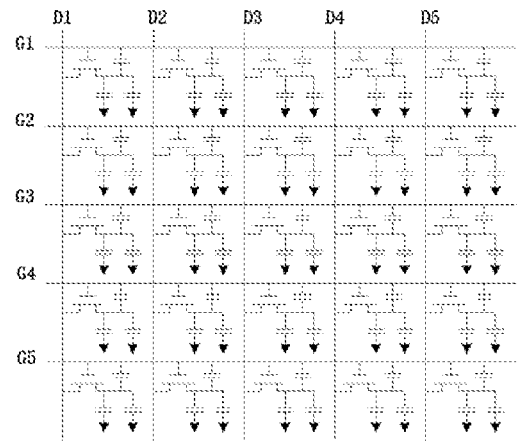
FIG. 1 is a schematic view of a pixel array of an in-cell touch liquid crystal panel.
Figure 2:
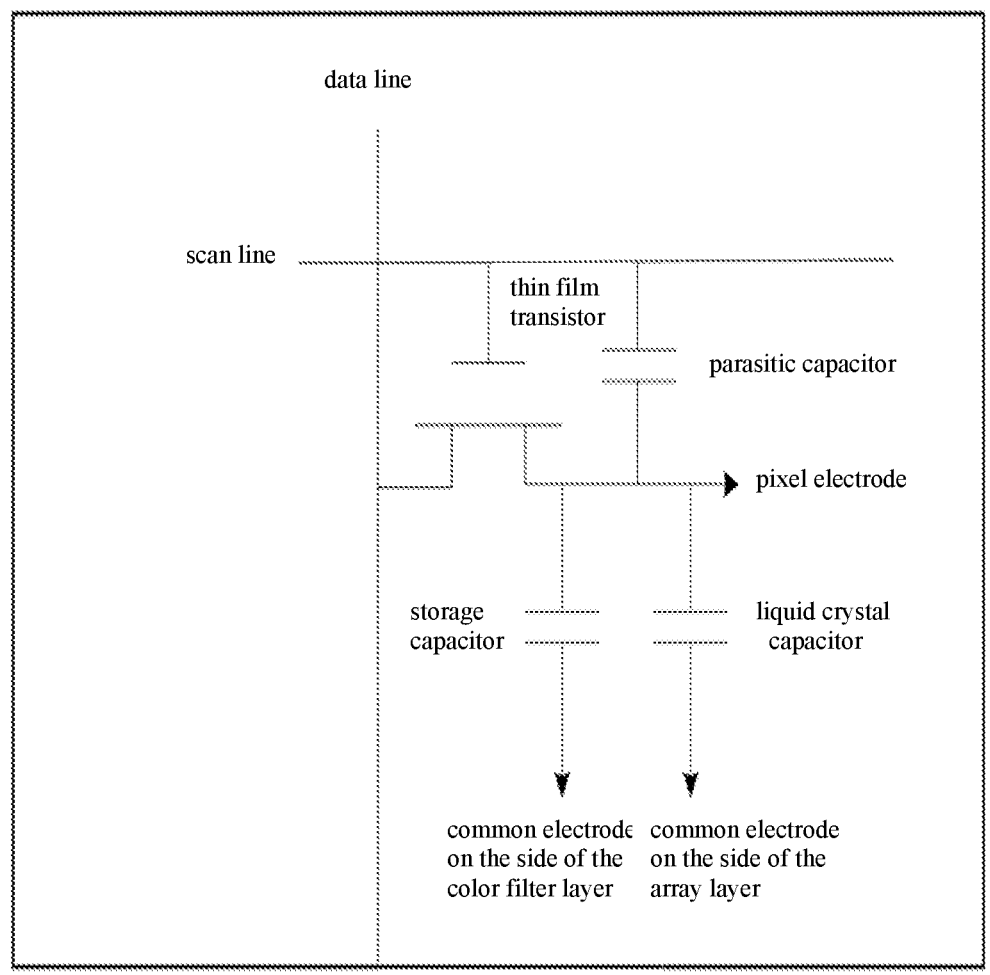
FIG. 2 is a schematic view of a pixel circuit.

It will now be detailed with reference to embodiments of the disclosure, and an example of the embodiment is shown in the accompanying drawings, wherein the like reference numeral refers to the same component. The embodiments are described with reference to the drawings as follows, so as to explain the disclosure.

Figure 3:
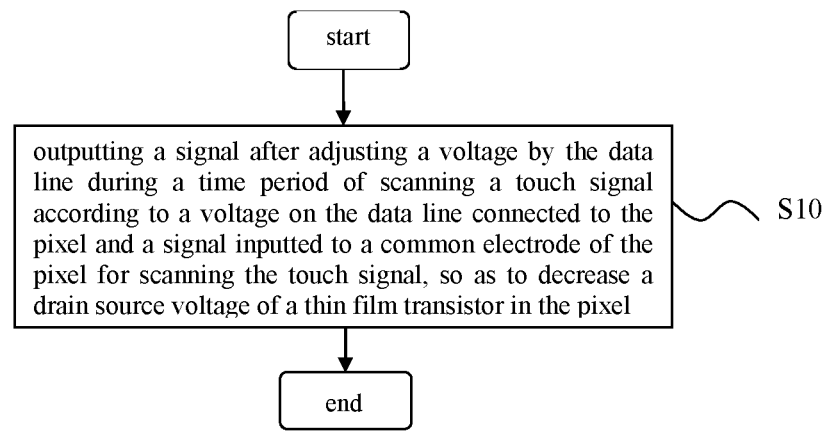
FIG. 3 is a flowchart of a method for decreasing a leakage current of an in-cell touch liquid crystal panel according to an exemplary embodiment of the disclosure.

FIG. 3 is a flowchart of a method for decreasing a leakage current of an in-cell touch liquid crystal panel according to an exemplary embodiment of the disclosure. Here, the in-cell touch liquid crystal panel includes a pixel array and a scan line and a data line connected to each pixel in the pixel array. The method may be achieved by the in-cell liquid crystal panel, and may also be achieved by a computer program, thereby achieving the above method when the program is executed.

Refer to FIG. 3. In the step S10, outputting a signal after adjusting a voltage by the data line during a time period of scanning a touch signal according to a voltage on the data line connected to the pixel and a signal inputted to a common electrode of the pixel for scanning the touch signal, so as to decrease a drain source voltage of a thin film transistor in the pixel.

Since the capacitor formed by the pixel electrode and the common electrode accounts a large portion of the whole for the pixel capacitor; therefore, during the time period of scanning the touch signal, the pixel voltage may generate strong coupling effect following the signal inputted to the common electrode for scanning the touch signal and a larger leakage occurs. Thus according to an exemplary embodiment of the disclosure, a drain source voltage is decreased by adjusting a voltage on the data line, thereby generating a lower leakage current.

As an example, in a case of the thin film transistor in the pixel is a P-type transistor (e.g., PMOS transistor), and when the voltage on the data line connected to the pixel is in a positive half period and the signal inputted to the common electrode of the pixel for scanning the touch signal is a pulse signal transformed from a low level to a high level, a signal after increasing a voltage is outputted by the data line during the time period of scanning the touch signal.

Here, the voltage in the positive half period is that a voltage is greater than or equals to 0, and the pulse signal transformed from the low level to the high level is that a pulse signal transformed from a negative voltage or a ground voltage to a positive voltage.

As an example, a voltage region of the signal after increasing the voltage may be: $[V_{data(min)}+(Vgh-Vgl)*Cgs/(Clc_{min}+Cst)]$ to $[V_{data(max)}+(Vgh-Vgl)*Cgs/(Clc_{max}+Cst)]$, wherein $V_{data(min)}$ indicates a minimum voltage on the data line, $V_{data(max)}$ indicates a maximum voltage on the data line, Vgh indicates a maximum voltage on the scan line, Vgl indicates a minimum voltage on the scan line, Cgs indicates a capacitance value of a parasitic capacitor between a gate and a source of the thin film transistor, Cst indicates a capacitance value of a storage capacitor, $Clc_{min}$ indicates a minimum capacitance value of a liquid crystal capacitor, and $Clc_{max}$ indicates a maximum capacitance value of the liquid crystal capacitor.

Figure 4:
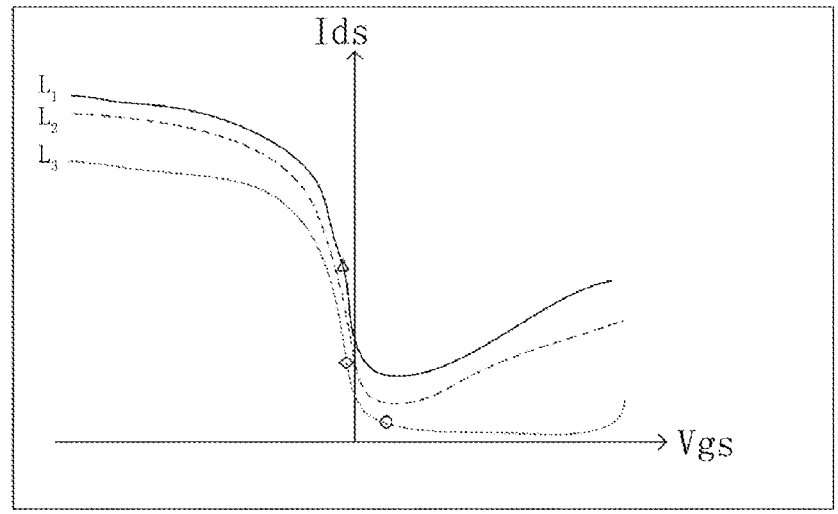
FIG. 4 is a schematic view of the leakage current for a P-type thin film transistor according to an exemplary embodiment of the disclosure.

FIG. 4 is a schematic view of the leakage current for a P-type thin film transistor according to an exemplary embodiment of the disclosure. Here, the abscissa indicates a gate source voltage (Vgs) of the thin film transistor, the ordinate indicates a drain source current (Ids) of the thin film transistor, $L_1$ indicates a IV curve when the drain source voltage of the thin film transistor is higher, $L_2$ indicates the IV curve when the drain source voltage of the thin film transistor is medium, $L_3$ indicates the IV curve when the drain source voltage of the thin film transistor is lower, a circle indicates a corresponding position when the LCD displays an image (i.e., the signal inputted to the common electrode is a signal for the display), a triangle indicates scanning the touch signal (i.e., the signal inputted to the common electrode is a signal for scanning the touch signal) and a corresponding position when the voltage on the data line is not increased, and a diamond indicates scanning the touch signal and a corresponding position when the voltage on the data line is increased. As shown in FIG. 4, when the signal inputted to the common electrode is the signal for the display (i.e., the position indicated by the circle), the drain source voltage is lower, and thus the leakage current is lower; when the signal inputted to the common electrode is the signal for scanning the touch signal and the voltage on the data is not increased (i.e., the position indicated by the triangle), the drain source is higher, and thus the leakage current is larger. According to the exemplary embodiment of the disclosure, since the voltage on the data line is increased during the period of scanning the touch signal (i.e., the position indicated by the diamond), the drain source voltage is decreased to decrease the leakage current.

Figure 5:
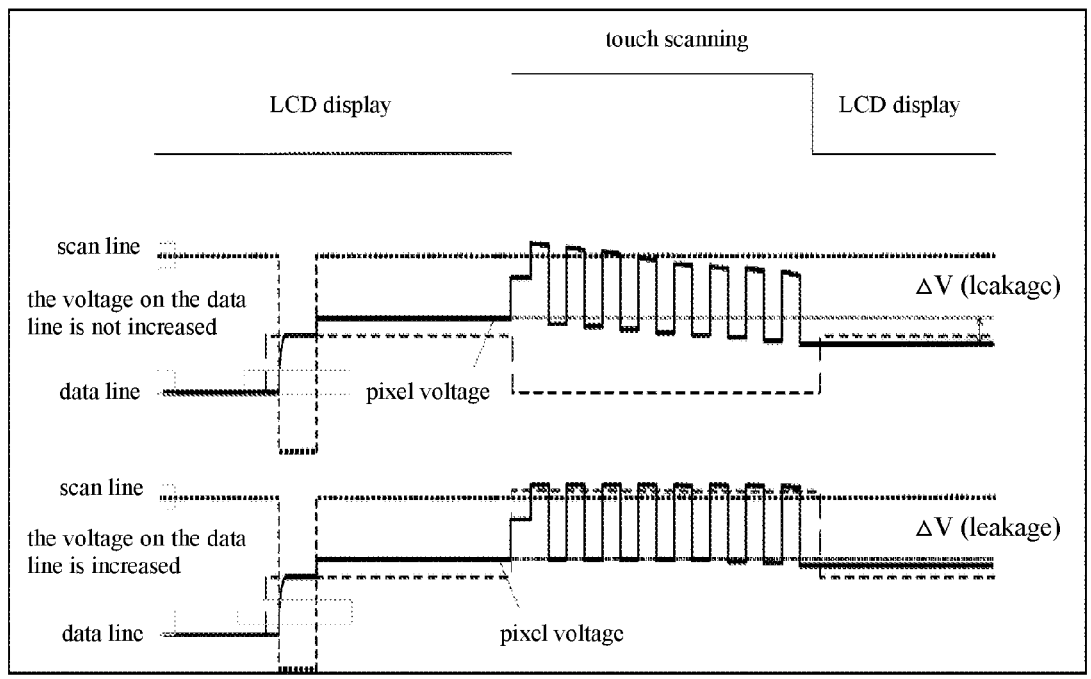
FIG. 5 is a correlogram before and after increasing a voltage for the P-type thin film transistor according to an exemplary embodiment of the disclosure.

FIG. 5 is a correlogram before and after increasing a voltage for the P-type thin film transistor according to an exemplary embodiment of the disclosure. As shown in FIG. 5, if the voltage on the data line is not increased during the period of scanning the touch signal, since the coupling effect occurs, a significant voltage drop (ΔV (leakage)) is generated to generate a larger leakage current, thereby increasing the power consumption and the frame quality is low. If the voltage on the data line is increased during the period of scanning the touch signal, a lower voltage drop is generated, thereby generating a lower leakage current.

As another example, in a case of the thin film transistor in the pixel is a N-type transistor (e.g., NMOS transistor), and when the voltage on the data line connected to the pixel is in a negative half period and the signal inputted to the common electrode of the pixel for scanning the touch signal is a pulse signal transformed from a high level to a low level, outputting a signal after decreasing a voltage by the data line during the time period of scanning the touch signal.

Here, the voltage in the negative half period is that a voltage is less than 0, and the pulse signal transformed from the high level to the low level is that a pulse signal transformed from a positive voltage or a ground voltage to a negative voltage.

As an example, a voltage region of the signal after decreasing the voltage is: $[-V_{data(min)}-(Vgh-Vgl)*Cgs/(Clc_{min}+Cst)]$ to $[-V_{data(max)}-(Vgh-Vgl)*Cgs/(Clc_{max}+Cst)]$, wherein, $V_{data(min)}$ indicates a minimum voltage on the data line, $V_{data(max)}$ indicates a maximum voltage on the data line, Vgh indicates a maximum voltage on the scan line, Vgl indicates a minimum voltage on the scan line, Cgs indicates a capacitance value of a parasitic capacitor between a gate and a source of the thin film transistor, Cst indicates a capacitance value of a storage capacitor, $Clc_{min}$ indicates a minimum capacitance value of a liquid crystal capacitor, and $Clc_{max}$ indicates a maximum capacitance value of the liquid crystal capacitor.

Figure 6:
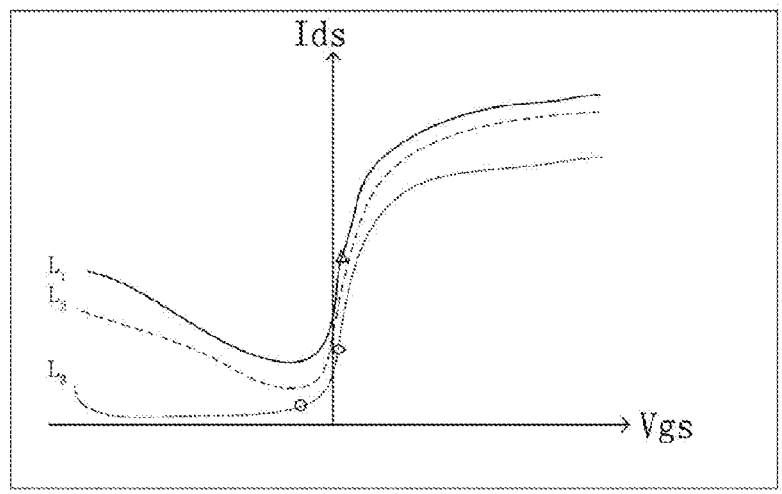
FIG. 6 is a schematic view of the leakage current for a N-type thin film transistor according to an exemplary embodiment of the disclosure.

FIG. 6 is a schematic view of the leakage current for a N-type thin film transistor according to an exemplary embodiment of the disclosure. Here, the abscissa indicates a gate source voltage (Vgs) of the thin film transistor, the ordinate indicates a drain source current (Ids) of the thin film transistor, $L_1$ indicates a IV curve when the drain source voltage of the thin film transistor is higher, $L_2$ indicates the IV curve when the drain source voltage of the thin film transistor is medium, $L_3$ indicates the IV curve when the drain source voltage of the thin film transistor is lower, a circle indicates a corresponding position when the LCD displays (i.e., the signal inputted to the common electrode is a signal for the display), a triangle indicates scanning the touch signal (i.e., the signal inputted to the common electrode is a signal for scanning the touch signal) and a corresponding position when the voltage on the data line is not decreased, and a diamond indicates scanning the touch signal and a corresponding position when the voltage on the data line is decreased. As shown in FIG. 6, when the signal inputted to the common electrode is the signal for the display (i.e., the position indicated by the circle), the drain source voltage is lower, and thus the leakage current is lower; when the signal inputted to the common electrode is the signal for scanning the touch signal and the voltage on the data is not decreased (i.e., the position indicated by the triangle), the drain source is higher, and thus the leakage current is larger. According to the exemplary embodiment of the disclosure, since the voltage on the data line is decreased during the period of scanning the touch signal (i.e., the position indicated by the diamond), the drain source voltage is decreased to decrease the leakage current.

Figure 7:
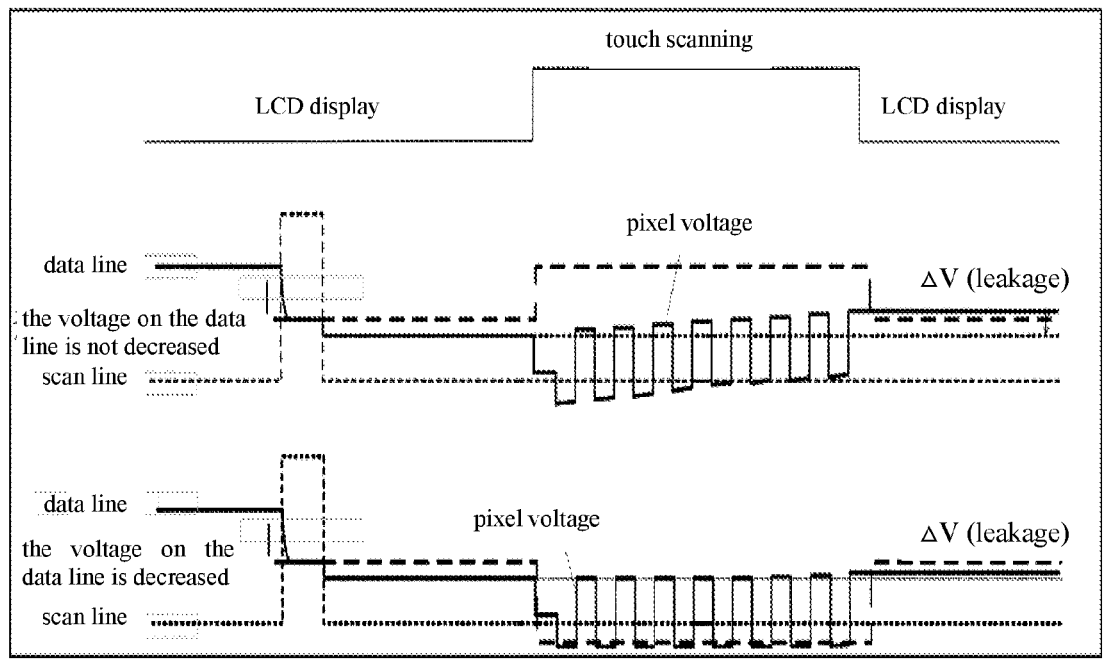
FIG. 7 is a correlogram before and after decreasing a voltage for the P-type thin film transistor according to an exemplary embodiment of the disclosure.

FIG. 7 is a correlogram before and after decreasing a voltage for the P-type thin film transistor according to an exemplary embodiment of the disclosure. As shown in FIG. 7, if the voltage on the data line is not decreased during the period of scanning the touch signal, since the coupling effect occurs, a significant voltage drop (ΔV (leakage)) is generated to generate a larger leakage current, thereby increasing the power consumption and the frame quality is low. If the voltage on the data line is decreased during the period of scanning the touch signal, a lower voltage drop is generated, thereby generating a lower leakage current.

Figure 8:
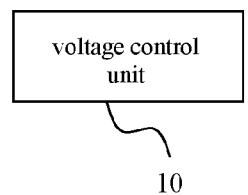
FIG. 8 is a diagram of a device for decreasing a leakage current of an in-cell touch liquid crystal panel according to an exemplary embodiment of the disclosure.

FIG. 8 is a diagram of a device for decreasing a leakage current of an in-cell touch liquid crystal panel according to an exemplary embodiment of the disclosure. Here, the in-cell touch liquid crystal panel includes a pixel array and a scan line and a data line connected to each pixel in the pixel array.

As shown in FIG. 8, according to an exemplary embodiment of the disclosure, the device for increasing the leakage current of the in-cell liquid crystal panel includes a voltage control unit 10. The unit may be achieved by a common hardware processor, such as a digital signal processor, a field programmable gate arrays, and may also be achieved by a dedicated hardware processor, such as a dedicated chip, other common hardware processor to achieve, but also by dedicated chips, and may further be achieved by a computer program implemented in a software, for example, it is implemented as a module installed in the software of the in-cell liquid crystal panel.

The voltage control unit 10 is used for outputting a signal after adjusting a voltage through the data line during a time period of scanning a touch signal according to a voltage on the data line connected to the pixel and a signal inputted to a common electrode of the pixel for scanning the touch signal, so as to decrease a drain source voltage of a thin film transistor in the pixel.

Since a capacitor formed of the pixel electrode and the common electrode accounts a large portion of the whole for the pixel capacitor, therefore, during the time period of scanning the touch signal, the pixel voltage may generate strong coupling effect following the signal inputted to the common electrode for scanning the touch signal and a larger leakage occurs, thus according to an exemplary embodiment of the disclosure, the voltage control unit 10 adjust the voltage on the data line to decrease the drain source voltage, thereby generating a lower leakage current.

As an example, in a case of the thin film transistor in the pixel is a P-type transistor (e.g., PMOS transistor), and when the voltage on the data line connected to the pixel is in a positive half period and the signal inputted to the common electrode of the pixel for scanning the touch signal is a pulse signal transformed from a low level to a high level, the voltage control unit 10 outputs a signal after increasing a voltage through the data line during the time period of scanning the touch signal.

As an example, a voltage region of the signal after increasing the voltage is: $[V_{data(min)}+(Vgh-Vgl)*Cgs/(Clc_{min}+Cst)]$ to $[V_{data(max)}+(Vgh-Vgl)*Cgs/(Clc_{max}+Cst)]$, wherein $V_{data(min)}$ indicates a minimum voltage on the data line, $V_{data(max)}$ indicates a maximum voltage on the data line, Vgh indicates a maximum voltage on the scan line, Vgl indicates a minimum voltage on the scan line, Cgs indicates a capacitance value of a parasitic capacitor between a gate and a source of the thin film transistor, Cst indicates a capacitance value of a storage capacitor, $Clc_{min}$ indicates a minimum capacitance value of a liquid crystal capacitor, and $Clc_{max}$ indicates a maximum capacitance value of the liquid crystal capacitor.

As another example, in a case of the thin film transistor in the pixel is a N-type transistor (e.g., NMOS transistor), and when the voltage on the data line connected to the pixel is in a negative half period and the signal inputted to the common electrode of the pixel for scanning the touch signal is a pulse signal transformed from a high level to a low level, the voltage control unit 10 outputs a signal after decreasing a voltage through the data line during the time period of scanning the touch signal.

As an example, a voltage region of the signal of after decreasing the voltage is: $[-V_{data(min)}-(Vgh-Vgl)*Cgs/(Clc_{min}+Cst)]$ to $[-V_{data(max)}-(Vgh-Vgl)*Cgs/(Clc_{max}+Cst)]$, wherein $V_{data(min)}$ indicates a minimum voltage on the data line, $V_{data(max)}$ indicates a maximum voltage on the data line, Vgh indicates a maximum voltage on the scan line, Vgl indicates a minimum voltage on the scan line, Cgs indicates a capacitance value of a parasitic capacitor between a gate and a source of the thin film transistor, Cst indicates a capacitance value of a storage capacitor, $Clc_{min}$ indicates a minimum capacitance value of a liquid crystal capacitor, and $Clc_{max}$ indicates a maximum capacitance value of the liquid crystal capacitor.

According to the exemplary embodiment of the disclosure, in the method and the device for decreasing the leakage current of the in-cell touch liquid crystal panel, it is capable of decreasing the drain source voltage of the thin film transistor in the pixel, thereby effectively decreasing the leakage current and increasing the frame quality.

Although some exemplary embodiments of the disclosure have been shown and described, those skilled in the art should understand that, without departing from the principles and spirit is defined in the scope of the disclosure is defined by the claims and their equivalents of the cases, these embodiment may be modified.

What is claimed is:

1. A method for decreasing a leakage current of an in-cell touch liquid crystal panel, wherein the panel comprises a pixel array and a scan line and a data line connected to each pixel in the pixel array, the method comprising:

during a time period of scanning a touch signal, and according to a voltage detected on the data line connected to the pixel and a signal input to a common electrode of the pixel, outputting a signal indicating the voltage has been adjusted through the data line so as to decrease a drain source voltage of a thin film transistor in the pixel, wherein the thin film transistor is a P type transistor or a N type transistor, and during the time period of scanning the touch signal, and when the voltage on the date line is in a positive half period and the signal input to the common electrode of the pixel for scanning the touch signal has transformed from a low pulse signal to a high pulse signal, outputting a signal through the data line indicating that the voltage has been increased, and during the time period of scanning the touch signal, and when the voltage on the date line is in a negative half period and the signal input to the common electrode of the pixel for scanning the touch signal has transformed from the high pulse signal to the low pulse signal, outputting a signal through the data line indicating that the voltage has been decreased, wherein a voltage region of the signal after increasing the voltage is:

$$[V_{data(min)}+(Vgh-Vgl)*Cgs/(Clc_{min}+Cst)] \text{ to}$$

$$[V_{data(max)}+(Vgh-Vgl)*Cgs/(Clc_{max}+Cst)],$$

wherein a voltage region of the signal after decreasing the voltage is:

$$[-V_{data(min)})-(Vgh-Vgl)*Cgs/(Clc_{min}+Cst)] \text{ to}$$

$$[-V_{data(max)}-(Vgh-Vgl)*Cgs/(Clc_{max}+Cst)],$$

wherein, $V_{data(min)}$ indicates a minimum voltage on the data line, $V_{data(max)}$ indicates a maximum voltage on the data line, Vgh indicates a maximum voltage on the scan line, Vgl indicates a minimum voltage on the scan line, Cgs indicates a capacitance value of a parasitic capacitor between a gate and a source of the thin film transistor, Cst indicates a capacitance value of a storage capacitor, $Clc_{min}$ indicates a minimum capacitance value of a liquid crystal capacitor, and $Clc_{max}$ indicates a maximum capacitance value of the liquid crystal capacitor.

2. A device for decreasing a leakage current of an in-cell touch liquid crystal panel, wherein the panel comprises a pixel array and a scan line and a data line connected to each pixel in the pixel array, the device comprising:

a processor configured to, during a time period of scanning a touch signal, and according to a voltage detected on the data line connected to the pixel and a signal input to a common electrode of the pixel, output a signal indicating the voltage has been adjusted through the data line so as to decrease a drain source voltage of a thin film transistor in the pixel, wherein the thin film transistor is a P type transistor or a N type transistor, during the time period of scanning the touch signal, and when the voltage on the date line is in a positive half period and the signal input to the common electrode of the pixel for scanning the touch signal has transformed from a low pulse signal to a high pulse signal, the processor outputs a signal through the data line indicating that the voltage has been increased, and during the time period of scanning the touch signal, and when the voltage on the date line is in a negative half period and the signal input to the common electrode of the pixel for scanning the touch signal has transformed from a high pulse signal to a low pulse signal, the processor outputs a signal through the data line indicating that the voltage has been decreased, wherein a voltage region of the signal after increasing the voltage is:

$$[V_{data(min)}+(Vgh-Vgl)*Cgs/(Clc_{min}+Cst)] \text{ to}$$

$$[V_{data(max)}+(Vgh-Vgl)*Cgs/(Clc_{max}+Cst)],$$

wherein a voltage region of the signal after decreasing the voltage is:

$$[-V_{data(min)})-(Vgh-Vgl)*Cgs/(Clc_{min}+Cst)] \text{ to}$$

$$[-V_{data(max)}-(Vgh-Vgl)*Cgs/(Clc_{max}+Cst)],$$

wherein, $V_{data(min)}$ indicates a minimum voltage on the data line, $V_{data(max)}$ indicates a maximum voltage on the data line, Vgh indicates a maximum voltage on the scan line, Vgl indicates a minimum voltage on the scan line, Cgs indicates a capacitance value of a parasitic capacitor between a gate and a source of the thin film transistor, Cst indicates a capacitance value of a storage capacitor, $Clc_{min}$ indicates a minimum capacitance value of a liquid crystal capacitor, and $Clc_{max}$ indicates a maximum capacitance value of the liquid crystal capacitor.

* * * * *